United States Patent
Cleveland

(10) Patent No.: US 12,231,465 B2
(45) Date of Patent: *Feb. 18, 2025

(54) WEB SITE COMPROMISE DETECTION

(71) Applicant: Visa International Service Association, San Francisco, CA (US)

(72) Inventor: Sam Cleveland, Leander, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/527,901

(22) Filed: Dec. 4, 2023

(65) Prior Publication Data

US 2024/0106858 A1    Mar. 28, 2024

Related U.S. Application Data

(63) Continuation of application No. 17/056,907, filed as application No. PCT/US2018/035457 on May 31, 2018, now Pat. No. 11,876,832.

(51) Int. Cl.
*H04L 9/40* (2022.01)

(52) U.S. Cl.
CPC ...... *H04L 63/1483* (2013.01); *H04L 63/1416* (2013.01); *H04L 63/145* (2013.01); *H04L 63/20* (2013.01)

(58) Field of Classification Search
CPC ............. H04L 63/1483; H04L 63/1416; H04L 63/145; H04L 63/20
See application file for complete search history.

(56) References Cited

U.S. PATENT DOCUMENTS

| | | | |
|---|---|---|---|
| 7,854,001 B1 * | 12/2010 | Chen | H04L 41/00 726/22 |
| 7,975,305 B2 | 7/2011 | Rubin et al. | |
| 8,631,498 B1 * | 1/2014 | Hart | H04L 63/145 726/25 |
| 10,169,585 B1 * | 1/2019 | Pilipenko | G06F 21/566 |
| 10,601,865 B1 * | 3/2020 | Mesdaq | H04L 63/1425 |
| 10,764,313 B1 | 9/2020 | Mushtaq | |

(Continued)

FOREIGN PATENT DOCUMENTS

| | | |
|---|---|---|
| EP | 3018879 A1 | 5/2016 |
| WO | 2011119976 A2 | 9/2011 |

OTHER PUBLICATIONS

U.S. Appl. No. 17/056,907, "Notice of Allowance", Sep. 6, 2023, 16 pages.

(Continued)

*Primary Examiner* — Ghodrat Jamshidi
(74) *Attorney, Agent, or Firm* — Kilpatrick Townsend & Stockton LLP

(57) ABSTRACT

A Web site comprise detection method and system are disclosed. The method includes obtaining a resource identifier associated with a remote computer, and then receiving source code associated with the resource identifier. The method also includes parsing the source code, analyzing the source code to determine an indicator of compromise is present in the source code, determining that the indicator of compromise is associated with malware meta-data, and storing the resource identifier associated with the source code associated with the malware meta-data in a database.

18 Claims, 5 Drawing Sheets

(56) References Cited

U.S. PATENT DOCUMENTS

| | | | |
|---|---|---|---|
| 10,904,286 B1 | 1/2021 | Liu | |
| 11,310,120 B1 | 4/2022 | Matkowsky | |
| 2006/0236401 A1* | 10/2006 | Fosdick | H04L 63/1458 |
| | | | 726/25 |
| 2008/0141332 A1* | 6/2008 | Treinen | H04L 63/1416 |
| | | | 726/1 |
| 2009/0300589 A1 | 12/2009 | Watters et al. | |
| 2010/0017880 A1 | 1/2010 | Masood | |
| 2010/0186088 A1 | 7/2010 | Banerjee et al. | |
| 2011/0066551 A1 | 3/2011 | Bruesewitz et al. | |
| 2013/0312081 A1 | 11/2013 | Shim et al. | |
| 2014/0020046 A1 | 1/2014 | Heitzman | |
| 2015/0135316 A1 | 5/2015 | Tock et al. | |
| 2015/0244738 A1* | 8/2015 | Lu | G06F 21/56 |
| | | | 726/23 |
| 2016/0086279 A1* | 3/2016 | Williams | G06Q 40/06 |
| | | | 705/36 R |
| 2018/0109426 A1 | 4/2018 | Hunt et al. | |
| 2018/0124110 A1* | 5/2018 | Hunt | G06F 16/951 |
| 2019/0065742 A1* | 2/2019 | Humphries | G06N 20/00 |
| 2019/0188380 A1* | 6/2019 | Animireddygari | G06F 21/568 |

OTHER PUBLICATIONS

PCT/US2018/035457, "International Preliminary Report on Patentability", Dec. 10, 2020, 8 pages.
PCT/US2018/035457, "International Search Report and Written Opinion", Feb. 27, 2019, 11 pages.

* cited by examiner

WEB SITE COMPROMISE DETECTION

CROSS REFERENCE TO RELATED APPLICATIONS

This application is a continuation application of U.S. application Ser. No. 17/056,907 filed Nov. 19, 2020, which is a National Stage of International Application No. PCT/US2018/035457 filed May 31, 2018, the disclosures of which are herein incorporated by reference in their entireties.

BACKGROUND

As users shift more of their daily lives online the importance of protecting a user's sensitive data has increased accordingly. With the development of asynchronous web applications, a malicious actor can send and retrieve data from a server asynchronously (in the background) without interfering with the display and behavior of a legitimate Web page. The ability to send and retrieve data from a server asynchronously makes any data entered by a user susceptible to man-in-the-middle eavesdropping or unauthorized invocation of functions implemented in asynchronous web applications. In this environment, a user may not be aware their personal data has been compromised until a malicious actor has used the sensitive data to conduct a transaction such as a purchase transaction and until the user has been notified.

Traditionally, a compromised Web site can be identified only after a threshold number of users have reported their sensitive data has been used by a malicious actor. Accordingly, a compromised Web site may operate for a long time before being identified as a compromised Web site. This method of detecting malicious actors is also not effective, because sensitive data for several users must be compromised before a compromised Web site can be identified.

Further, traditional antivirus software that is used to detect malicious code is run on a server and is managed by an administrator responsible for the server. The administrator may be a human and may have limited ability to constantly check to see if the server is running malicious code.

In view of the above-noted problems, systems and methods for improving Web site compromise detection are needed. Embodiments described herein address this and other problems, both individually and collectively.

BRIEF SUMMARY

Embodiments of the invention provide for improved systems and methods to detect the compromise of Web sites.

Embodiments described herein provide techniques that can be used to detect Web sites that may be compromised by a malicious actor. In some embodiments, a server computer may be configured to run a threat detection software application. The threat detection software application can obtain a resource identifier associated with a Web site on a remote computer. The threat detection software application may receive source code associated with the resource identifier and parse the source code. The parsed source code can be analyzed to detect an indicator of compromise. The threat detection software application can determine that the indicator of compromise is associated with known malware meta-data. It may then store the resource identifier associated with the source code that includes the known malware meta-data in a database. In some embodiments, the threat detection software application can identify an entity associated with the resource identifier and transmit a compromise notification to the entity. In some embodiments, the compromise notification can be submitted to the entity associated with the resource identifier and a hosting provider.

Another embodiment is directed to a server computer comprising a processor, and a computer readable medium coupled to the processor. The computer readable medium comprises code, executable by the processor, for implementing the above-described method.

These and other embodiments are described in further detail below.

DETAILED DESCRIPTION

Figure 1:
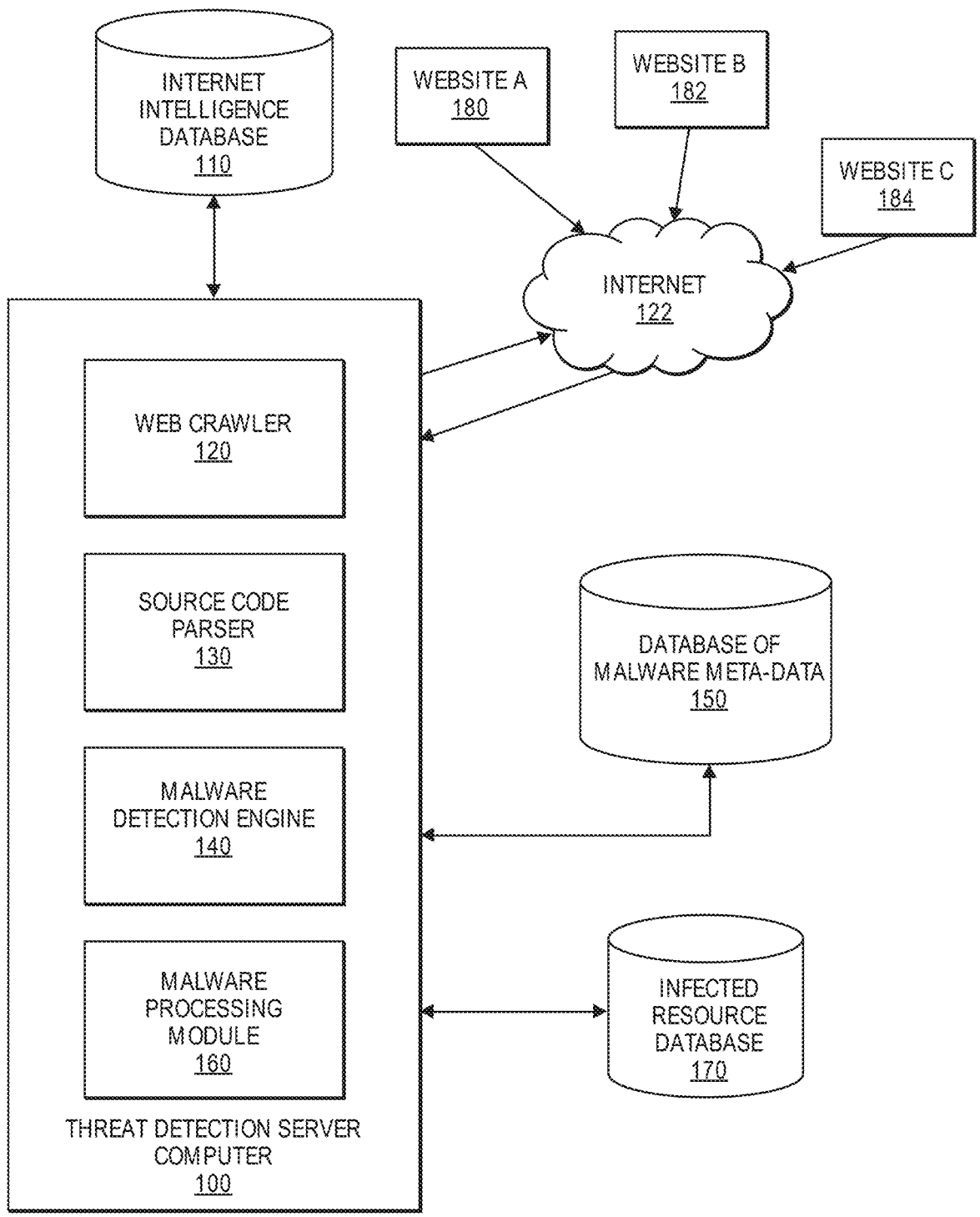
FIG. 1 shows a block diagram illustrating a system as well as a process flow for compromise detection according to some embodiments.

Prior to discussing the details of some embodiments of the present invention, description of some terms may be helpful in understanding the various embodiments.

A "computer" may be a device that includes one or more electronic components (e.g., an integrated chip) that can communicate with another device. For example, a computer can be a computing device that includes at least one processor coupled to a memory that stores instructions or code for execution by the processor. A computer may include a communication device that can be transported and operated by a user, and may include one or more electronic components (e.g., an integrated chip). A computer may provide remote communication capabilities to a network. The computer can be configured to transmit and receive data or communications to and from other devices. A computer may be in the form of a mobile device such as a mobile phone (e.g., smart phone, cellular phone, etc.), tablets, portable media player, personal digital assistant devices (PDAs), wearable device (e.g., watch, health monitoring device such as a fitness tracker, etc.), electronic reader device, etc., or in the form of a card (e.g., smart card) or a fob, etc. Examples of computers may also include portable computing devices (e.g., laptops, netbooks, ultrabooks, etc.). A computer may also be in the form of a vehicle (e.g., an automobile), or be integrated as part of a vehicle (e.g., an infosystem of a vehicle).

A "processor" may refer to any suitable data computation device or devices. A processor may comprise one or more microprocessors working together to accomplish a desired function. The processor may include a CPU that comprises at least one highspeed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "database" may include a structured set of data held in a computer. A database may be include a conventional, fault tolerant, relational, scalable, secure database such as Oracle™ or Sybase™. A database may be implemented using various standard data-structures, such as an array, hash, (linked) list, structured text file (e.g., XML), table, and/or the like. Such data-structures may be stored in memory and/or in (structured) files.

A "server computer" may include a powerful computer or cluster of computers. For example, the server computer can be a large mainframe, a minicomputer cluster, or a group of servers functioning as a unit. In one example, the server computer may be a database server coupled to a web server. The web server may run multiple web applications. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "message" may include any communication from one party or entity to another party or entity. The communication may include, for example, information or data in any suitable form. Further, the message may be transmitted by any suitable method such as, for example, over a network.

A "resource provider" may refer to an entity that can provide resources. Examples of resource providers include merchants, governmental agencies, etc. A resource provider may operate a resource provider computer.

A "network" can include a group of computer systems and other computing hardware devices that are linked together through communication channels to facilitate communication and resource-sharing among a wide range of users. Networks may be public or private.

"Sensitive information" may refer to information for which protection from unauthorized usage is desired, or information for which privacy protection is desired. For example, sensitive information may refer to confidential information, or may refer to information that can be used by an unauthorized entity to commit fraud such as fraudulent transactions or identity theft. Examples of sensitive information may include trade secret, corporate confidential information, confidential legal documents, government protected data, etc. Examples of sensitive information may also include personal information such as health data, social security numbers, contact information, location information, and/or financial information such as account identifiers, rewards information, loyalty program information, etc. Sensitive information may also include cryptographic keys that can be used to encrypt or decrypt information.

A "resource" may include an object, data, or program that can be used by another entity to function. Examples of resources may include a Web site and/or one or more individual Web pages of the Web site. A resource may include an HTML document and embedded content such as objects, scripts, applets, etc. included therein. In some embodiments, resource may refer to individual elements in the HTML document such as a reference, script, an applet, a source document, a JSON document, objects rendered by the browser according to the document object model, etc.

A "resource identifier" may typically be associated with a resource (e.g., a Web page) that can be requested using one or more protocols such as HTTP and TCP/IP. A resource identifier may be in the form of a URI (uniform resource identifier) such as a URL (uniform resource locator).

An "indicator of compromise" may refer to data that can be used to identify a resource that has been compromised by a malicious actor. Examples of indicators of compromise may include HTML elements, Internet protocol addresses (IPv4, IPv6, and the like), domain names, subdomains, web applications, host pairs, tracker IDs, code signatures, etc. A host pair can be two domains (a parent and a child) that share a connection, such as a parent domain providing HTML code with a script source reference to a child domain.

A "transport entity" may include an entity that operates a computer that can transport or process data. An example of a transport entity can be an acquirer, which operates an acquirer computer.

A "material entity" include may an entity responsible for receiving and processing a threshold volume of sensitive data provided by users. For example, a material entity may be a Level 1 or Level 2 merchant; a service provider putting many entities at risk; a well-known and/or trusted brand that is not a merchant, and/or an entity with a window of exposure over 180 days.

An "issuer" may include an entity that maintains an account for a user. An issuer may also issue account parameters associated with the user's account.

A "merchant" may typically be an entity that engages in transactions and can sell goods or services, or provide access to goods or services.

An "acquirer" may be an entity such as a bank that has a business relationship with a particular merchant or other entity.

A "token" may include a substitute identifier for some information. For example, a transaction token may include an identifier for a transaction account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "real account identifier" may include an original account identifier associated with an account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

"Account parameters" may include information relating to an account that can be used to conduct a transaction on the account. Examples of account parameters may include information that can be used to identify an account of the user (e.g., real account identifier, alternate account identifier, token, etc.), data or information relating to the status of the account, one or more keys that are used to generate cryptographic information, data or information relating to the one or more keys, etc. An account parameter can be semi-static or dynamic. A dynamic account parameter may be an account parameter that has a limited lifespan, and which once expired, can no longer be used to conduct a transaction until the account parameter is replenished, refreshed, or renewed. A dynamic account parameter may be replenished frequently during the lifetime of an account. A semi-static account parameter may be an account parameter that has an extended lifespan that is longer than a dynamic account parameter, and can be replenished less frequently than a dynamic account parameter or not at all during the lifetime of the account.

A "key" may include a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

Details of some embodiments of the present invention will now be described.

FIG. 1 shows a block diagram illustrating a system that can be used for compromise detection according to some embodiments of the invention. The system can include a threat detection server computer 100, which is in communication with a number of databases including an Internet intelligence database 110, a database of malware meta-data 150, and an infected resource database 170. The threat detection server computer 100 may also be in communication with a number of Web sites 180, 182, 184 via the Internet 122.

The threat detection server computer 100 can run a threat detection software application, and can include a number of software modules. The software modules may include a web crawler 120, a source code parser 130, a malware detection engine 140, and a malware processing module 160. The threat detection server computer 100 can be configured to obtain a resource identifier associated with a Web site run on a remote computer.

In some embodiments, threat detection server computer 100 can obtain the resource identifier associated with the Web site run on the remote computer from an Internet intelligence database 110. The remote computer may be associated with a host pair where a first host is associated with a resource (e.g., a Web site) to be monitored and a second host associated with a command and control (C2) server that is affiliated with that remote computer. Command-and-control servers are used by attackers to maintain communications with compromised systems within a target network. Thus, the C2 server may be associated with a malicious actor.

Once obtained, the threat detection server computer 100 may process data received from the Internet intelligence database 110 to obtain the resource identifier associated with the remote computer. In some embodiments, the Internet intelligence database 110 or the threat detection server computer 100 may determine that the remote computer is a C2 server hosting malware using any suitable information including DNS resolution data, WHOIS records, SSL certificate/IP address associations, suspect reference IDs, tracker IDs, host pairs, filenames, source code, etc.

The threat detection server computer 100 can be configured or programmed to request and receive source code associated with the resource identifier. In some embodiments, the threat detection server computer 100 can use the web crawler 120 to obtain the source code associated with the resource identifier. In some embodiments, the resource identifier can identify resources (e.g., Web pages) that include references to a C2 server and the web crawler 120 can be configured to obtain source code from the references associated with the C2 server. Web sites associated with the C2 server can be identified using host pairs determined by the threat detection server computer 100 or provided by the Internet intelligence database 110. The web crawler 120 can also be configured to communicate with a server associated with the resource identifier via the Internet 122. In some embodiments, the web crawler 120 can query multiple resource identifiers associated with a C2 server. The web crawler 120 can receive source code from Web site A 180, Web site B 182, and Web site C 184. In some embodiments, the source code can include the HTML code including elements, tags, text, host pairs, and document references. The source code can also include embedded content, JavaScript (JS) code, etc. The web crawler 120 can be configured to receive source code associated with dynamic resources such as objects generated by JS code.

The threat detection server computer 100 can include a source code parser 130. The source code parser 130 can, in conjunction with a data processor, parse the received source code to identify one or more blocks to be analyzed and discard information that may not be used in compromise detection. In some embodiments, the one or more blocks can be associated with a particular HTML element, such as JS code. According to some embodiments, the source code can be associated with one or more instructions that use or process sensitive information. For example, the source code can be associated with a form that is used by a Web site to collect data from a user. In some instances, this may be sensitive data such as personally identifiable information and/or account parameters of a user.

Illustratively, Web site A 180 may be associated with a malicious domain and include a malicious web application (e.g., unauthorized code, malware, etc.). The source code parser 130 can receive the source code associated with Web site A 180 from the web crawler 120 and, in conjunction with a data processor, detect a web application with function calls and parameters that are associated with an asynchronous web application. The source code parser 130, in conjunction with a data processor, can pass the source code to the malware detection engine 140 for further processing. As another example, the source code parser 130 can be configured to pass JavaScript executable code, such as code associated with a skimmer, to the malware detection engine 140. Executable code associated with a skimmer can transmit sensitive data to a malicious domain as the data is entered by the user into the web application. A skimmer allows a malicious actor to asynchronously copy data from a resource (e.g., a Web site or Web pages) without affecting transmission of the sensitive data to the entity that should legitimately receive the sensitive data. Skimmers can continue to asynchronously collect data until the sensitive data is used in an unauthorized manner and later detected, or an administrator associated with the resource identifies the resource as being infected.

The threat detection server computer 100 can include a malware detection engine 140. In some embodiments, the malware detection engine 140 can, in conjunction with a data processor, analyze the received source code to determine if an indicator of compromise is present in the source code. Analyzing the source code can include identifying one or more of a signature, a behavior, a URL, a domain name, a filename, an IP address, etc. in the source code. The malware detection indicator 140, in conjunction with the data processor, can ignore and/or discard trusted data in the source code. For example, URLs associated with trusted domains can be discarded by the malware detection engine 140 and the data processor. In some embodiments, the malware detection engine 140, in conjunction with a data processor, can identify remote JavaScript indicators of compromise such as URLs, domain names, file names, etc. In some embodiments, the malware detection engine 140, in conjunction with the data processor, can identify local JavaScript indicators of compromise by determining a code signature or performing a behavior analysis on the source code.

After identifying an indicator of compromise, the malware detection engine 140 can determine whether the indicator of compromise is associated with known malware meta-data. Malware meta-data can include signatures, URLs, domains, filenames, IP addresses, etc. In some embodiments, the malware detection engine 140, in conjunction with the data processor, can access a database of malware meta-data 150 to determine if the indicator of compromise is associated with known malware meta-data. The database of malware meta-data 150 can be updated by the threat detection server computer 100 or by a third-party security provider.

After determining that an indicator of compromise is associated with known malware meta-data, the threat detection server computer 100 can be configured to store the resource identifier associated with the source code that included the known malware signature in an infected resource database 170. In addition to the resource identifier, references, in the infected resource, to a malicious server and/or a malicious domain name configured to host the malicious server can be stored in the infected resource database 170. In some embodiments, the name of the JavaScript file as well as the malicious code can be stored in the infected resource database 170. In some embodiments, the threat detection server computer 100 can update the database of malware meta-data 150 and the Internet intelligence database 110 using one or more of the resource identifier, the reference to the malicious server, the malicious domain name, the name of the JavaScript file, the malicious code, etc.

Figure 2:
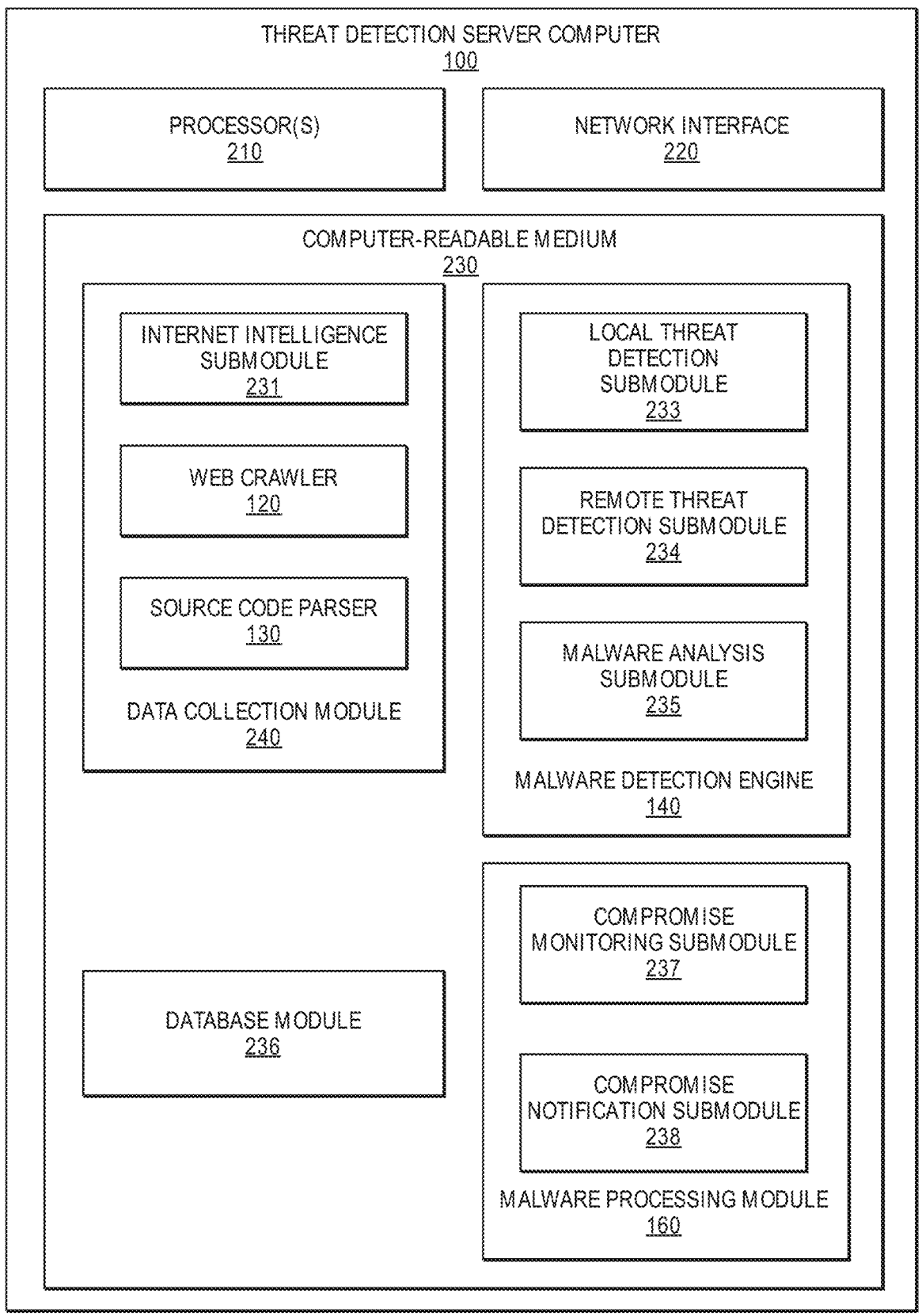
FIG. 2 shows a block diagram of a threat detection server computer, according to some embodiments.

FIG. 2 shows a block diagram of a threat detection server computer 100, according to some embodiments of the invention. The threat detection server computer 100 can include one or more data processors 210. The one or more data processors 210 can be coupled to a computer readable medium 230 and a network interface 220. The computer readable medium 230 may include a data collection module 240, a malware detection engine 140, a malware processing module 160, and a database module 236. The instructions on the computer readable medium 230 may comprise code, executable by the one or more processors 210, for initializing and managing the data collection module 240, the malware detection engine 140, the malware processing module 160, and the database module 236, for performing the functionality described herein.

The data collection module 240 can include an Internet intelligence submodule 231, a web crawler 120, and a source code parser 130. These software modules have already been described above with respect to FIG. 1.

The malware detection engine 140 can include a local threat detection module 233, a remote threat detection submodule 234, and a malware meta-data analysis submodule 235.

The malware processing module 160 can include a compromise monitoring submodule 237 and a compromise notification module 238.

The database module 236 can, in conjunction with the one or more processors 210, allow the threat detection server computer 100 to communicate with the previously described databases including the Internet intelligence database 110, a database of malware meta-data 150, and/or an infected resource database 170 (see FIG. 1). The database module 236 can be configured to implement one or more data structures such as an array, a hash map, a (linked) list, a structured text file (e.g., XML), table, and/or the like in the various databases. The one or more data structures can be stored in local memory or remotely. In some embodiments, the database module 236 can update the Internet intelligence database 110, the database of malware meta-data 150, and/or the infected resource database 170 with new indicators of compromise associated with known malware signatures.

The data collection module 240 can obtain a resource identifier associated with a remote computer and collect source code from the remote computer. In some embodiments, the Internet intelligence submodule 231 can obtain the resource identifier from the Internet intelligence database 110 in FIG. 1. The Internet intelligence database 110 in FIG. 1 can include, for example, resource identifiers associated with resources that collect sensitive data such as personally identifiable information, financial information, account data, and the like. In some embodiments, account data can include a real account identifier, account parameters, a token, a key, a limited use key, etc. In some embodiments, the Internet intelligence database 110 can include additional datasets such as DNS resolution data, WHOIS records, SSL certificate/IP address associations, suspect resource IDs, trackers, host pairs, etc. The Internet intelligence submodule 231 can identify a subset of resource identifiers from the datasets obtained from the Internet intelligence database 110. For example, the Internet intelligence submodule 231 may determine the subset of resource identifiers based on WHOIS data. A WHOIS query can return data associated with registered users and/or assignees of an Internet resource, such as a domain name, an IP address block, or an autonomous system. In some embodiments, a WHOIS query of a malicious assignee can return domains registered to the malicious assignee. In some embodiments, the subset of resource identifiers may include information associated with a known and/or suspect malicious command and control server. In other embodiments, the subset of resource IDs may be associated a particular type of resource, such as an eCommerce Web site.

After obtaining the resource identifier, the data collection module 240, in conjunction with the processor(s) 210, can cause the web crawler 120 to retrieve the source code associated with the resource identifier. The web crawler 120, in conjunction with the processor(s) 210, can initiate a session with a remote computer associated with the resource identifier. In some embodiments, the web crawler 120, in conjunction with the processor(s) 210, can initiate an HTTP session by establishing a TCP connection to a particular port on the remote computer associated with the resource identifier. The web crawler 120, in conjunction with the processor(s) 210, can transmit a request message that causes the remote computer associated with the resource identifier to send data associated with the requested resource identifier.

In some embodiments, the web crawler 120, in conjunction with the processor(s) 210, can transmit a request message that causes the remote computer associated with the resource identifier to send meta-data without having to send the entire content of the resource. The web crawler 120, in conjunction with the processor(s) 210, can receive the data associated with the resource identifier from the remote computer. In some embodiments, the data associated with the resource identifier can be the source code associated with a web page. The web crawler 120 can, in conjunction with the processor(s) 210, request, using the resource identifier, and receive data associated with code libraries, page content, and other elements associated with different resources in the source code associated with the web page.

The source code can be parsed by the source code parser 130, in conjunction with the processor(s) 210, to discard elements that are not associated with indicators of compromise. For example, the source code parser 130 can remove one or more blocks of code associated with non-malicious content. Non-malicious content can be, for example, a reference to a remote computer associated with a secure resource, static markup language, presentation definition languages, etc. Content considered non-malicious can depend on the signatures being analyzed by the malware detection engine. In some embodiments, the source code parser 130 can be configured to parse source code associated with one or more elements from the source code associated with the web page. For example, the source code parser 130 can be configured to parse one or more JavaScript blocks from the source code and provide the JavaScript blocks to be analyzed.

The malware detection engine 140, in conjunction with the processor(s) 210, can be configured to access the source code parsed by the source code parser 130 of the data collection module 240. The malware detection engine 140, in conjunction with the processor(s) 210, can analyze the source code to determine an indicator of compromise is present. The remote threat detection submodule 234 can, in conjunction with the processor(s) 210, analyze the source code to determine a remote indicator of compromise, such as a URL, a domain name, a filename, etc., is present. The local threat detection submodule 233 can, in conjunction with the processor(s) 210, analyze the source code to determine a local indicator of compromise, such as malware source code or a malware signature, is present. In some embodiments, the local threat detection submodule 233 can, in conjunction with the processor(s) 210, analyze an element in the source code, such as a script, to determine a signature associated with the element. The local threat detection submodule 233 can, in conjunction with the processor(s) 210, include behavior-based malware detection to determine a signature associated with the malware. An element's behavior can be analyzed using dynamic analysis and static analysis. For example, dynamic analysis can evaluate the source code for malicious behavior as it executes. Malicious behavior can include skimming data from a webpage. Static analysis can look at the element's code and structure for suspicious activities such as including instructions for connecting to a server.

The malware detection engine 140, using malware analysis submodule 235, can, in conjunction with the processor(s) 210, determine that the indicator of compromise (local or remote) is associated with malware metadata. In some embodiments, the malware analysis submodule 235 can, in conjunction with the processor(s) 210, access the database of malware meta-data 150 to determine the indicator of compromise is associated with known malware. In some embodiments, the database of malware meta-data 150 can be accessed over the Internet using the network interface 220.

After determining that the indicator of compromise is associated with known malware, the malware processing module 160, in conjunction with the processor(s) 210, can cause the database module 236 to store the resource identifier associated with the known malware in an infected resource database 170. In some embodiments, the database module 236 can, in conjunction with the processor(s) 210, update the Internet intelligence database 110 and the database of malware meta-data 150 with the resource identifier and additional data identified by the data collection module 240 and the malware detection engine 140.

In addition to storing the resource identifier associated with the known malware, in some embodiments, the malware processing module 160 can, in conjunction with the processor(s) 210, transmit a notification associated with the resource identifier and continue to monitor data associated with the resource identifier for known malware. The notification can include a compromise notification and/or a take-down notification. The compromise notification can include details for finding and remediating the malware infection. The take-down notification can cause the infected resource and/or a malicious domain associated with the infected resource to be taken off-line. In some embodiments, the threat detection server computer 100 can provide an interface for entities associated with an infected resource to track the status of infections, compromise notifications, and take-down notifications.

Although shown with the data collection module 240, the malware detection engine 140, the malware processing module 160, and the database module 236, any suitable number of modules or engines may be utilized to perform the functionality described herein in connection with compromise detection.

Figure 3:
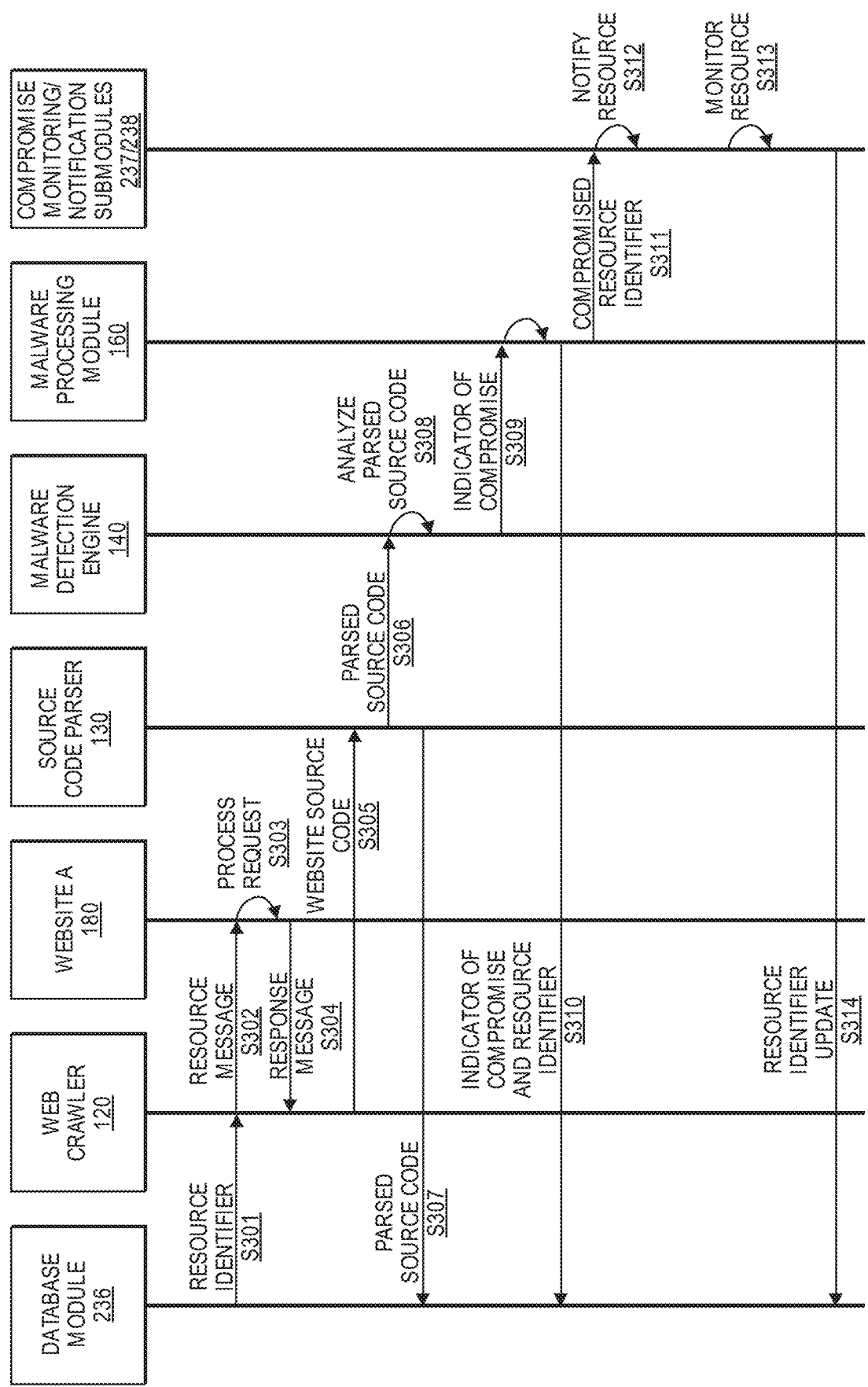
FIG. 3 shows a communication flow diagram of a method for compromise detection according to some embodiments.

FIG. 3 shows a communication flow diagram of a method 300 for compromise detection according to some embodiments. At least part of the method 300 can be performed by a threat detection server computer (e.g., the threat detection server computer 100 of FIG. 1). The method 300 may involve the database module 236, the web crawler 120, the Web site A 180, the source code parser 130, the malware detection engine 140, the malware processing module 160, the compromise monitoring submodule 237, and the compromise monitoring submodule 238. Each of these modules may perform functions in conjunction with one or more data processors. In embodiments, steps of the method 300 may occur over a network, such as the Internet 122 of FIG. 1. The Internet intelligence database of the database module 236 can include one or more server computers configured to scrape remote computers for one or more resource identifiers. In some embodiments, the database module 236, the web crawler 120, the source code parser 130, the malware detection engine 140, the malware processing module 160, the compromise monitoring submodule 237, and the compromise monitoring submodule 238 can include one or more server computers configured to run a threat detection software application.

At step 301, the database module 236 provides a resource identifier, obtained from an Internet intelligence database, to the web crawler 120. In some embodiments, the Internet intelligence database can provide a resource identifier based on DNS resolution data, WHOIS records, SSL certificate/IP address associations, suspect resource identifiers, trackers, host pairs, etc. that indicate a remote computer may be in communication with a malicious command and control server. For example, a host pair may identify a first resource identifier associated with a target Web site and a second resource identifier associated with a malicious command and control server.

At step S302, a request can be submitted from web crawler 120 to Web site A 180, wherein Web site A 180 is associated with the resource identifier. For example, the web crawler 120 may send an HTTP GET method request to Web site A 180. At step S303, the request message causes Web site A 180 to process the request message. To process the request message, the Web site A 180 can prepare a status line and a response message using a resource associated with the resource identifier. Processing the request can include transmitting both the status line and the response message.

At step S304, the status line and the response message can be received by the web crawler 120. The response message can include source code associated with the resource identifier. At step S305, the web crawler 120 can transmit the Web site source code associated with the resource identifier to the source code parser 130. The source code can include or be embodied by, for example, an HTML document and any elements, tags, objects, scripts, applets, etc. In some embodiments, the HTML document may include a reference associated with an object, script, applet, etc. and the web crawler 120 can be configured to request and receive the source code associated with the reference.

At step S306, the source code parser 130 can submit parsed source code to the malware detection engine 140. The source code parser 130 can be configured to parse the Web site source code based on one or more characteristics associated with the source code. For example, source code associated with an HTML document can be parsed to eliminate any data not associated with a <script> tag. The source code parser 130 can reduce the amount of data submitted to the malware detection engine 140 reducing the bandwidth required transmit the data and the processing time to scan the data.

At step S308, the malware detection engine can analyze the source code to determine if an indicator of compromise is present. A remote indicator of compromise can include URLs, domain names, file names, and the like that are identified in the parsed source code. A local indicator of compromise can include a signature based on the dynamic analysis (behavior as it executes) and/or static analysis (tags, methods, objects, etc.) of the parsed source code.

At step S309, the malware processing module 160 can receive one or more indicators of compromise from the malware detection engine 140. The malware processing module 160 can be configured to determine that the indicator of compromise is associated with known malware meta-data. An indicator of compromise associated with known malware meta-data can be used to identify a compromised resource associated with the resource identifier. The known malware meta-data can include a malware signature, a behavior, a URL, a domain name, a filename, an IP address, source code, etc. In some embodiments, the malware processing module 160 can query a database of malware meta-data to determine if a known malware signature, a known malicious behavior, a known malicious URL, a known malicious domain name, a known filename, a known malicious IP address, etc. matches the indicator of compromise identified in the source code.

At step 310, the malware processing module 160 can transmit a message with the indicator of compromise and/or the associated resource identifier. The message causes the database module 236 to store the indicator of compromise and/or the resource identifier in at least one or more of the Internet intelligence database, the database of malware meta-data, and/or the infected resource database. In some embodiments, in addition to the indicator of compromise and/or the resource identifier, the message from the malware processing module 160 can include a malicious server identifier, a malicious domain name associated with the host of the malicious server, a name of the JavaScript file, malicious code, etc.

At step 311, the malware processing module 160 can pass a compromised resource identifier based on the resource identifier associated with indicator of compromise in the known malware database. The compromise monitoring submodule 237 and the compromise notification submodule 238 can be configured to receive the compromised resource identifier and additional information, such as the indicator of compromise.

At step S312, the compromise notification submodule 238 can determine an entity associated with the compromised resource identifier and transmit a notification to the entity, wherein the message includes data indicating that the resource is compromised by known malware. At step S313, the compromise monitoring submodule 237 can be configured to monitor the resource associated with the compromised resource identifier. The compromise monitoring submodule 237 can be configured to check the resource continuously or at predetermined intervals for a threshold period of time to determine if the resource still includes indicators of compromise associated with known malware and/or known malware meta-data. The threshold period of time can be depend on the resource identifier. In some embodiments, the threshold period of time can be 10 days. In some embodiments, steps S312 and S313 can be automated by the threat detections server computer. Automating these steps can decrease the amount of time that sensitive data is at risk of exposure to malware.

At step S314, the compromise monitoring submodule 237 can determine that the monitored resource includes neither known malware nor known malware meta-data and transmit a resource identifier update to the database module. The resource identifier update can indicate the resource identifier is no longer associated with known malware or malware meta-data. The database module 236 can update at least one or more of the Internet intelligence database, the database of malware meta-data, and/or the infected resource database.

Figure 4:
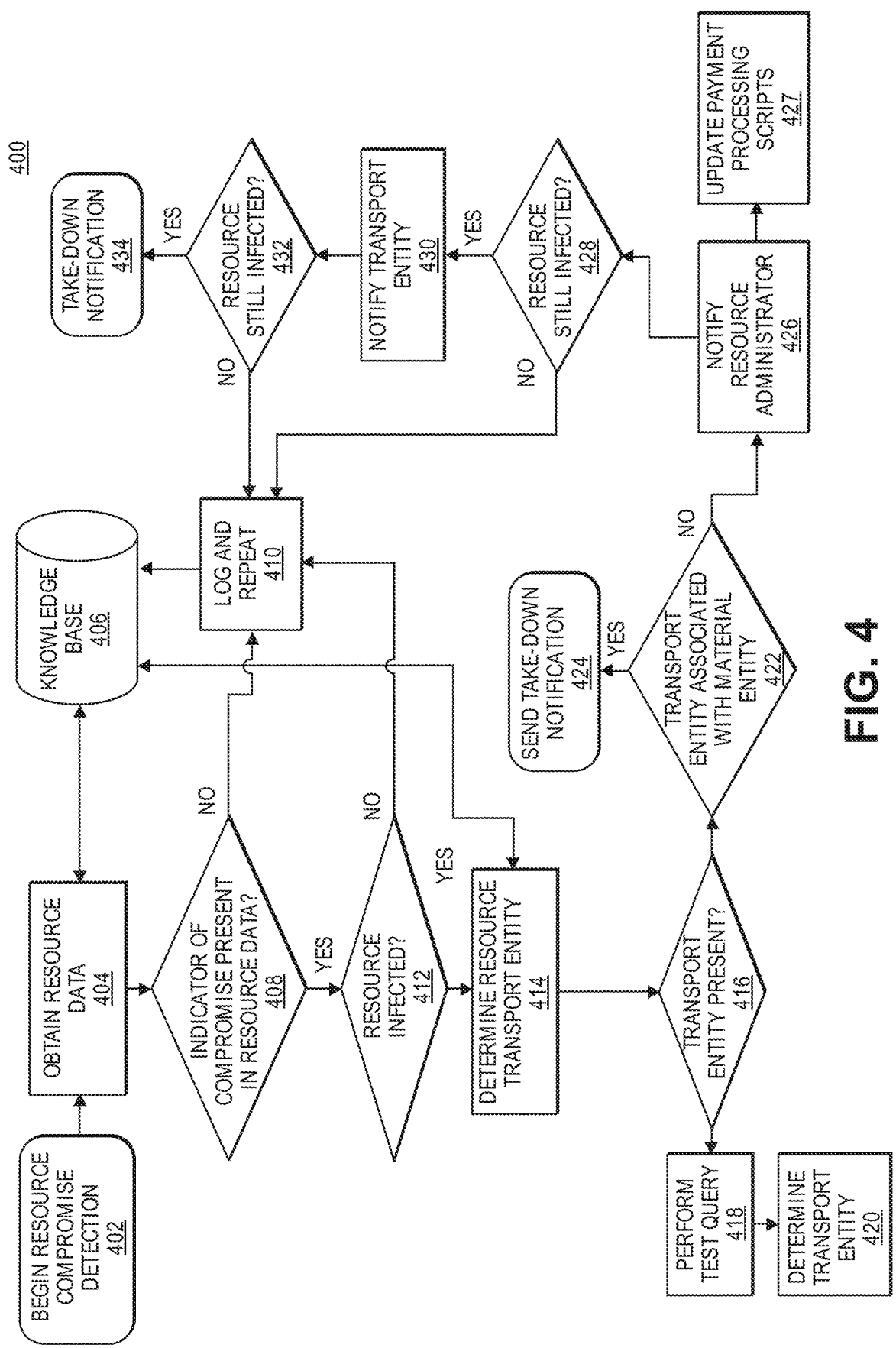
FIG. 4 shows a diagram of a process flow of a compromise detection system according to some embodiments.

FIG. 4 shows a diagram of a process flow 400 of a compromise detection system according to some embodiments. Initially, a threat detection software application can begin executing on a threat detection server computer at 402. Resource data can be obtained at 404. Obtaining resource data at 404 can include obtaining a resource identifier for a resource from knowledge base 406 and receiving the source code associated with the resource. In some embodiments, the resource identifier or the resource provider associated with the resource identifier can be part of a host pair; the first host can be associated with the resource identifier and the second host can be associated with a malicious command and control server. The knowledge base 406 may comprise one or more databases, such as database 110, 150, and/or 170 of FIG. 1.

The threat detection server computer can determine if the resource data includes one or more indicators of compromise. If the resource data does not include an indicator of compromise, the threat detection server computer can log data indicating the resource identifier is not associated with malware at 410 and repeat the process with a new resource identifier from the knowledge base 406. If the resource data does include an indicator of compromise, the indicator of compromise can be processed to determine, at 412, whether the indicator of compromise is associated with known malware meta-data. The known malware meta-data can be obtained from the knowledge base 406. If the indicator of compromise is not associated with known malware meta-data, the threat detection server computer can log data indicating the resource identifier is not associated with malware at 410 and repeat the process with a new resource identifier from the knowledge base 406.

If the indicator of compromise is associated with known malware meta-data, the threat detection server computer can determine if a transport entity is associated with the entity that operates the resource at 414. The entity that operates the resource may be a resource provider such as a merchant. A transport entity (such as an acquirer) can include any suitable entity responsible for processing the sensitive data entered by a user with a resource (e.g., a merchant Web site) administered by an entity such as a resource provider. In some embodiments, the knowledge base 406 can include a transport entity repository. The transport entity repository can be a database of resource provider (associated with the resource identifier) and transport entity pairs. Each pair can identify the transport entity responsible for processing sensitive data collected by the resource associated with the resource identifier. In some embodiments, the transport entity repository can identify an administrator or entity such as a resource provider (e.g., an e-commerce merchant) responsible for the resource and the transport entity (an acquirer) responsible for handling the sensitive data collected by the resource (e.g., a merchant Web site). In some embodiments the transport entity repository can be a merchant-acquirer repository. Each pair can identify a merchant responsible for the resource and an acquirer responsible for processing the sensitive data collected by the resource.

At 416, if the resource and the entity operating the resource is not associated with a transport entity in the knowledge base, a test query using the resource can be performed to determine the transport entity. At 418 the test query can provide test data to the infected resource and request the resource. The test data can be a non-sensitive and unique identifier. At 420, the transport entity can be identified when it uses the test data. For example, if the transport entity is an acquirer that handles an account of an eCommerce merchant, at 418, a test purchase can be performed. The test purchase can attempt a purchase on an infected resource hosted on an eCommerce Web site with a unique account number associated with a zero balance or insufficient funds to complete the purchase. Because the balance is zero, the transaction will be declined. A record of declined transactions can be maintained including the merchant and the account numbers. At 420, an acquiring bank identification number (BIN) and Card Acceptor Identification (CAID) associated with the eCommerce merchant that attempted the transaction can be determined by searching the record of declined transactions and the unique account number.

If the transport entity is present at 416 and/or if the test query was successful, the method can determine if the entity (e.g., a merchant) associated with the resource (a merchant Web site) is a material entity at 422. A material entity can include, for example, entities that process a threshold volume of sensitive data, hosting service providers associated with a threshold number of resources processing sensitive data, large brands operating resources that collect sensitive data, merchants with a window of exposure over 180 days, etc. In some embodiments, the material entity can be associated with an eCommerce Web site. An entity associated with an eCommerce Web site may be a material entity if it is a level 1 or level 2 merchant according to the Payment Card Industry Data Security Standard (PCI-DSS). Level 1 merchants can include any merchant, regardless of acceptance channel, processing more than a threshold number of 6,000,000 transactions per year. Additionally, level 1 merchants can include any merchant that has had a data breach or attack that resulted in an account data compromise within a threshold time period or any merchant identified by any card association within a threshold time period. Level 2 merchants can include any merchant processing 1-6 million transactions annually.

If the entity is associated with a material entity, a take-down notification can be transmitted at 424. The take-down notification can be transmitted to the material entity and/or additional entities associated with the sensitive data. The take-down notification can be transmitted to a system configured to contain the compromise of sensitive data. For example, if the material entity is a level 1 merchant, a take-down notification can be transmitted to the merchant, an acquirer that has a relationship with the merchant, and/or a fraud and breach investigation system. In some embodiments, the take-down notification can cause the fraud and breach investigation system to begin a take-down process to contain the compromise of sensitive data.

If the entity is not a material entity, a message can be transmitted to an administrator and/or host provider associated with the infected resource at 426. The message can notify the resource administrator that the resource is infected. In some embodiments, the message can be transmitted to a notification service provider. The notification service provider can be a system configured to identify and notify the administrator and/or the host provider upon receiving the message indicating there is an infected resource. The message can include a compromise notification that includes details for finding and remediating the malware infection. At 428, the infected resource can be monitored to determine if the administrator and/or host provider (e.g., an e-commerce merchant) has taken-down or fixed the infected resource. In some embodiments, data can be exchanged with the notification service provider to determine if the infected resource has been taken-down or fixed. If the infected resource no longer has indicators of compromise in the resource data, the associated resource identifier can be logged at 410 and the process repeated for a new resource identifier.

In some embodiments, the infected resource may be an HTML document that includes one or more elements with references to a payment processing server in communication with the threat detection server. In these embodiments, the payment processing server may provide a payment processing script that includes instructions to execute a transaction using a web browser. At 427, the threat detection server can transmit an instruction that causes the payment processing server to update the payment processing script to include instructions that mitigate the compromise of sensitive data. When rendered by a web browser requesting the infected resource, the instructions provided with updated payment processing script, can cause the web browser to ignore and/or delete elements of the HTML document associated with the indicators of compromise. The updated payment processing script can include instructions that cause the web browser to perform functions illustrated by modules or steps described in FIGS. 1-5. In some embodiments, the payment processing script can include one or more JavaScript instructions.

At 428, if the resource is still infected, the entity associated with the resource can be notified at 430. The resource can be monitored for a threshold time period before the entity associated with the resource is notified. The threshold time period can be based on the resource and/or the transport entity. The threshold time period can be 10 days. A compromise notification can be transmitted to the entity that includes infection details for finding and remediating the malware infection. In some embodiments, data can be exchanged with the notification service provider to determine if the infected resource has been taken-down or fixed. At 432, the infected resource can be monitored to determine if the entity administering the resource removed the malware. If the infected resource no longer has indicators of compromise in the resource data, the associated resource identifier can be logged at 410 and the process repeated for a new resource identifier.

If, at 432, the resource is still infected, the take-down notification can be transmitted to a take-down system and/or a fraud and breach investigation system. In some embodiments, the resource can be monitored for a second threshold time period before a take-down notification is transmitted. The second threshold time period can be based on the resource and/or the transport entity. The second threshold time period can be 10 days. The take-down system can be configured to cause a take-down of the host of the infected resource and/or the host of the associated malware. The fraud and breach investigation system can be configured to initiate a PCI forensic investigation.

Figure 5:
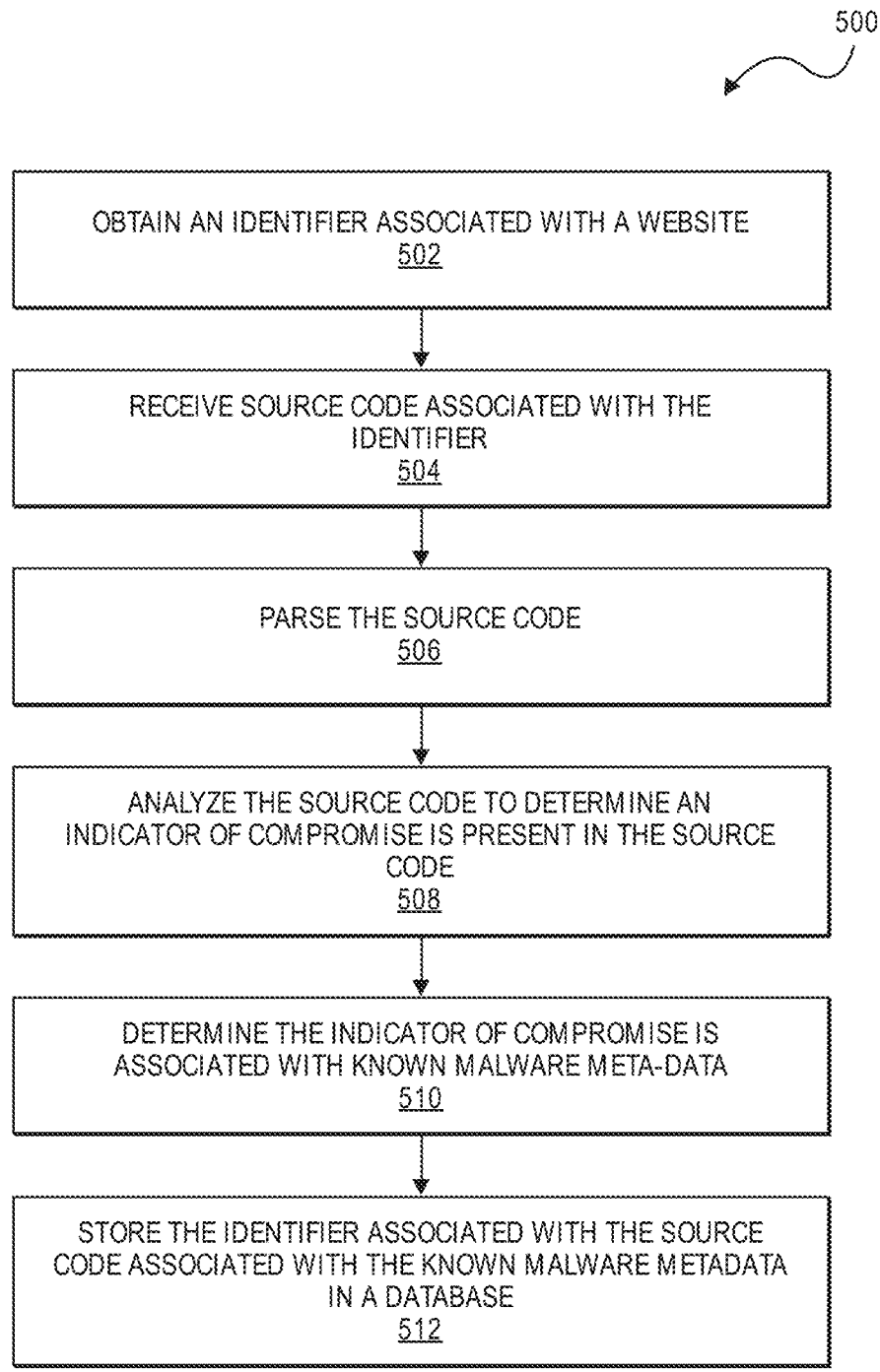
FIG. 5 shows the steps of a method for compromise detection according to some embodiments.

FIG. 5 shows the steps of a method 500 for compromise detection according to some embodiments. At step 502, the method can obtain a resource identifier associated with a remote computer. In some embodiments, the resource identifier can be one of a plurality of resource identifiers associated with a type of Web site. The method can transmit the resource identifier to the remote computer as part of a request message, and the request message can cause the remote computer to transmit a resource associated with the resource identifier. In some embodiments, the resource identifier can be associated with source code of the resource. The remote computer can transmit the source code.

At step 504, the source code associated with the resource identifier can be received. At step 506 the source code can be parsed to remove source code data not used for malware detection. At step 508, the source code can be analyzed to determine an indicator of compromise is present in the source code. At step 510, the indicator of compromise can be processed to determine whether the indicator of compromise is associated with a known malware meta-data. The known malware meta-data can include a malware signature, a behavior, a URL, a domain name, a filename, an IP address, source code, etc. At step 512, the resource identifier associated with the source code associated with the known malware meta-data can be stored in a database.

In some embodiments, one or more modules of a threat detection software application can be provided in response to a request message associated with the resource identifier. For example, an HTML document associated with the resource identifier can include instructions to retrieve one or more objects provided by an entity responsible for processing the sensitive data. The entity can use one or more modules from the threat detection software application with an object associated with a reference in the HTML document. In some embodiments, the entity can provide a script with instructions to cause a user's browser to perform one or more of the steps described in FIGS. 1-5.

Embodiments of the invention have a number of advantages.

Embodiments of the invention allow for the disruption of fraud at a larger scale by focusing efforts on the source of eCommerce malware. Some of the malicious C2 domains are actively infecting over 25 merchant sites at once. By removing the C2 server, embodiments of the invention can disable the malware that has infected multiple merchants. In addition to protecting multiple merchants with a single action, disrupting the malicious infrastructure directly affects the ability of cybercriminals to compromise merchant Web sites now and in the future, as reestablishing malicious infrastructure takes time, money, and effort by criminals.

Takedowns are a significant time-consuming endeavor and require knowing the correct contacts for different hosting providers. Using embodiments of the invention to manage the takedowns ensures the malicious servers are shut down quickly and saves a significant amount of time.

Also, automating much of the detection process can free up investigative resources to focus on handling high impact, priority cases, while resolving more compromises than ever before. Time spent manually identifying compromises, contacting acquirers, and awaiting reports, can be used to identify a new malicious infrastructure.

Without the automated process, a large portion of intelligence resources will need to be applied to simple, repetitive processes. Most organizations do not have the resources to handle the current volume of merchant compromises, and will not be able to resolve each compromise.

As described, the systems and methods described herein may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Python, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
   (a) obtaining, by a threat detection server computer running a threat detection software application, a resource identifier associated with a remote computer;
   (b) receiving, by the threat detection server computer, source code associated with the resource identifier;
   (c) parsing, by the threat detection server computer, the source code;
   (d) analyzing, by the threat detection server computer, the source code to determine an indicator of compromise is present in the source code;
   (e) determining, by the threat detection server computer, that the indicator of compromise is associated with malware meta-data;
   monitoring the source code associated with the resource identifier associated with the malware meta-data for a threshold time period;
   determining that the source code includes the malware meta-data; and
   transmitting, after determining that the source code includes the malware meta-data, a compromise notification associated with the malware meta-data to a transport entity.

2. The method of claim 1 further comprising:
   providing at least one from among the indicator of compromise, the source code, and the malware meta-data associated with the resource identifier to a database.

3. The method of claim 1 further comprising:
   receiving an identity of a malicious domain; and
   determining that the source code includes instructions that cause the remote computer to access the malicious domain.

4. The method of claim 1 further comprising:
   receiving a plurality of host pairs; and
   analyzing the plurality of host pairs to determine that one or more host pairs of the plurality of host pairs includes a first host corresponding a malicious domain and a second host corresponding to the resource identifier.

5. The method of claim 1 further comprising
   determining that the indicator of compromise is associated with a malicious domain; and
   generating a take-down message identifying the malicious domain.

6. The method of claim 1 further comprising:
   transmitting the compromise notification to an administrator associated with the resource identifier.

7. The method of claim 1, further comprising:
   monitoring the source code associated with the resource identifier for the malware meta-data for a second threshold time period;
   determining the source code includes the malware meta-data; and
   thereafter, transmitting a take-down notification.

8. The method of claim 1 further comprising repeating at least (a) to (e) for a plurality of resource identifiers.

9. The method of claim 1, wherein the indicator of compromise is a malware signature.

10. The method of claim 1, further comprising:
    storing, by the threat detection server computer, the resource identifier associated with the source code associated with the malware meta-data in a database.

11. A server computer comprising:
    a processor;
    and
    a non-transitory computer-readable medium comprising instructions in a form of code, the instructions, when executed by the processor, cause the processor to execute a method including:
    obtaining a resource identifier associated with a remote computer;
    receiving source code associated with the resource identifier;
    parsing the source code;
    analyzing the source code to determine an indicator of compromise is present in the source code;
    determining that the indicator of compromise is associated with known malware meta-data;
    monitoring the source code associated with the resource identifier associated with the malware meta-data for a threshold time period;
    determining that the source code includes the malware meta-data; and
    transmitting, after determining that the source code includes the malware meta-data, a compromise notification associated with the malware meta-data to a transport entity.

12. The server computer of claim 11 wherein the method further includes:
    providing at least one from among the indicator of compromise, the source code, and the malware meta-data associated with the resource identifier to a database.

13. The server computer of claim 11 wherein the method further includes:
    receiving an identity of a malicious domain; and
    determining the source code includes instructions that cause the remote computer to access the malicious domain.

14. The server computer of claim 11, wherein the method further includes:
    receiving a plurality of host pairs; and
    analyzing the plurality of host pairs to determine that one or more host pairs of the plurality of host pairs includes a first host corresponding a malicious domain and a second host corresponding to the resource identifier.

15. The server computer of claim 11, wherein the method further includes:
    determining that the indicator of compromise is associated with a malicious domain; and
    generating a take-down message identifying the malicious domain.

16. The server computer of claim 11, wherein the method further includes:
    transmitting the compromise notification to an administrator associated with the resource identifier.

17. The server computer of claim 11, wherein the method further includes:
    monitoring the source code associated with the resource identifier for the malware meta-data for a second predetermined time period;
    determining that the source code includes the malware meta-data; and
    thereafter, transmitting a take-down notification.

18. The server computer of claim 11, wherein the method further includes:
    storing the resource identifier associated with the source code associated with the malware meta-data in a database.

* * * * *